United States Patent
Tattermusch

[19]

[11] Patent Number: 5,566,969
[45] Date of Patent: Oct. 22, 1996

[54] REAR AXLE SUSPENSION WITH REDUCED OVERSTEER

[75] Inventor: Peter Tattermusch, Esslingen, Germany

[73] Assignee: Mercedes-Benz AG, Germany

[21] Appl. No.: 457,695

[22] Filed: Jun. 1, 1995

[30] Foreign Application Priority Data

Jun. 1, 1994 [DE] Germany .......................... 44 19 221.5

[51] Int. Cl.⁶ .................................................. B60G 11/00
[52] U.S. Cl. .......................... 280/688; 280/689; 280/726; 301/127
[58] Field of Search ...................... 280/688, 689, 280/725, 726, 724, 723, 721, 109, 110; 301/127

[56] References Cited

U.S. PATENT DOCUMENTS

| | | |
|---|---|---|
| 2,234,025 | 3/1941 | Dellert . |
| 2,753,190 | 7/1956 | Hooven . |
| 3,239,235 | 3/1966 | Kozicki . |
| 4,326,734 | 4/1982 | Kroninger ............................ 280/688 |
| 4,466,636 | 8/1984 | Cornacchia et al. ................ 280/688 |
| 5,054,575 | 10/1991 | Collins . |

FOREIGN PATENT DOCUMENTS

| | | |
|---|---|---|
| 2225301 | 11/1974 | France . |
| 2319507 | 2/1977 | France . |
| 2507131 | 12/1982 | France . |
| 2612460 | 9/1988 | France . |
| 2742426 | 3/1979 | Germany ............................ 280/688 |
| 2751997A1 | 5/1979 | Germany . |
| 3039051 | 5/1982 | Germany ............................ 280/726 |
| 3119810A1 | 12/1982 | Germany . |
| 435022 | 9/1935 | United Kingdom . |
| 1155591 | 6/1969 | United Kingdom . |
| 2048795 | 12/1980 | United Kingdom . |

OTHER PUBLICATIONS

Fahrwerktechnik: Radaufhängungen, Jörnsen Reimpell, 3 pages, 1986.

*Primary Examiner*—Eric D. Culbreth
*Attorney, Agent, or Firm*—Evenson, McKeown, Edwards & Lenahan P.L.L.C.

[57] ABSTRACT

A motor vehicle rear axle suspension has an inherently stiff axle guide member. The axle guide member is articulated by a universal joint on the vehicle body in the central longitudinal plane of the vehicle. Lateral guidance is effected by a lateral guide linkage. In order to reduce the tendency of the rear axle to oversteer under the action of a lateral force, an axle tube has a configuration curved in the forward direction of travel and is articulated directly on the body by a universal joint.

4 Claims, 1 Drawing Sheet

REAR AXLE SUSPENSION WITH REDUCED OVERSTEER

BACKGROUND AND SUMMARY OF THE INVENTION

The present invention relates to a rear axle suspension, and more particularly, to a motor vehicle rear axle suspension having an inherently stiff axle guide member with an axle tube which extends transversely to the direction of travel and at each of the two ends of which a wheel is mounted. The axle guide member is supported on a vehicle body in the region of each of the two axle tube ends by a respective bearing spring and is articulated on the body by a universal joint in the region of the central longitudinal plane of the vehicle, in front of the wheel rotation axis, referring to the forward direction of travel. The suspension has a lateral guide linkage which consists of two individual links and in which the one link is articulately supported, at its one end in the region near the wheel, on one end of the axle tube, and the other link is articulately supported, by its end in the region near the wheel, on the other end of the axle tube. The other two ends of the two links are articulated to a coupling device which permits equalizing movements of the links in the transverse direction and which is fastened to the vehicle body in the region of the central longitudinal plane of the vehicle. The fastening point of the coupling device lays behind the points of support of the links on the axle tube, referring to the forward direction of travel.

In a suspension described in FR-OS 2 319 507, the axle guide member is formed by a straight axle tube which connects the two wheels to one another and to which is fastened a bar which in turn is articulated on the vehicle body by a universal joint in the central longitudinal plane of the vehicle. Transverse guidance is effected by a Watt linkage which is articulated on the axle tube in the region near the wheel and to the body in the region of the central longitudinal plane of the vehicle. Because the distance between the articulation point of the Watt linkage on the body and the wheel rotation axis is infinitesimal compared with the distance between the articulation point of the axle guide member on the body and the wheel rotation axis when a lateral force occurs (e.g., during cornering), the force component supported in the transverse direction at the articulation point of the bar is relatively slight compared with the force component which has to be supported in the transverse direction at the articulation point of the Watt linkage on the body.

Almost the entire transverse force is thus supported through the mounting of the Watt linkage on the body in the known suspension. Consequently, when a lateral force occurs (e.g., cornering), through the comparatively only very slight action of this lateral force, the bar can also travel only a short distance relative to a given elasticity of the bar mounting in the transverse direction. The axle thus has a slight tendency to oversteer under the action of a lateral force. Even the slightest elasticity at the mounting point of the Watt linkage on the body very considerably increases this undesirable roll steer effect of the axle under the action of a lateral force. The ability to adapt the mounting of the axle guide member and that of the Watt linkage on the body, in respect of elasticity in the transverse direction, is thus greatly restricted.

Reimpell Fahrwerktechnik: Radaufhängungen (Wheel Suspensions), p. 182 (1st Ed. 1986), describes a rear axle in which the axle tube has a configuration curved in the forward direction of travel and, in the region of the central longitudinal plane of the vehicle, is articulated to the vehicle body by a universal joint. The transverse guidance of this rear axle is effected by two tie rods which extend obliquely and each of which is articulately connected, on one hand, to the axle tube and, on the other hand, to the vehicle body.

In a rear axle described in DE-OS 27 51 997, the axle body is formed of two gear casings which are arranged in the region near the wheel and extend in the forward direction of travel. Those ends of the gear casings which lie at the front in the forward direction of travel are in each case connected by a respective tube portion to a differential situated in the region of the central longitudinal plane of the vehicle. The differential is, in turn, connected via a joint to the vehicle body. Transverse guidance of this rear axle is effected by a Watt linkage which extends substantially at the height of the axes of rotation of the wheels and the rocker of which is articulated on the vehicle body. Those ends of the links of the Watt linkage which are each remote from the rocker are articulated on a respective gear casing. Since the Watt linkage extends substantially at the height of the axes of wheel rotation, lateral guide forces, for example during cornering, are supported practically exclusively by the Watt linkage.

An object on which the present invention is based is, therefore, to provide a rear axle suspension of the aforementioned kind, with which the tendency to oversteer under the action of a lateral force can be reduced, and with which the ability to adapt the mounting of the axle guide member and that of the lateral guide linkage on the body can be improved.

The foregoing object has been achieved in accordance with the present invention by a rear axle suspension in which the axle tube has a configuration curved in the forward direction of vehicle travel, the axle tube is articulated on the vehicle body by a universal joint, and a distance between the axle tube, in a region of articulation of the axle tube on the vehicle body, and the axis of rotation of the wheel is substantially equal to a distance from the lateral guide linkage, in a region of articulation thereof on the vehicle body, to the axis of rotation of the wheel.

Because of the substantially equal distance from the axis of rotation of the wheel to the point of articulation of the axle tube, which is curved in the forward direction of travel, on the body and to the articulation of the lateral guide linkage on the body, a lateral force occurring is supported in approximately equal parts by the mounting of the axle tube on the body and by the mounting of the lateral guide linkage on the body. In relation to a given elasticity in the support of the axle tube on the body in the transverse direction, under the action of a lateral force, a greater distance is thus travelled, so that the tendency to oversteer is reduced.

Furthermore, because of the equal division of the transverse forces now made between the two mounting points (axle tube and lateral guide linkage) on the body, the elasticities in the two mountings can be adapted to one another in an optimum manner in respect of neutral steering behavior under the action of a lateral force.

The rear axle suspension according to the present invention also has the advantage that only little installation space is required but sufficient space is nevertheless always still available to receive a lowered part of the body such as, for example, a recess for a spare wheel or a fuel tank.

With the configuration according to the present invention, a relatively great sweep of the lateral guide linkage is obtained. This has the advantage that the force level in the two links, which are subjected only to-tension and compression, is reduced by this increased sweep.

BRIEF DESCRIPTION OF THE DRAWINGS

These and further objects, features and advantages of the present invention will become more readily apparent from the following detailed description when taken in conjunction with the accompanying drawings wherein.

DETAILED DESCRIPTION OF THE DRAWINGS

Figure 1:
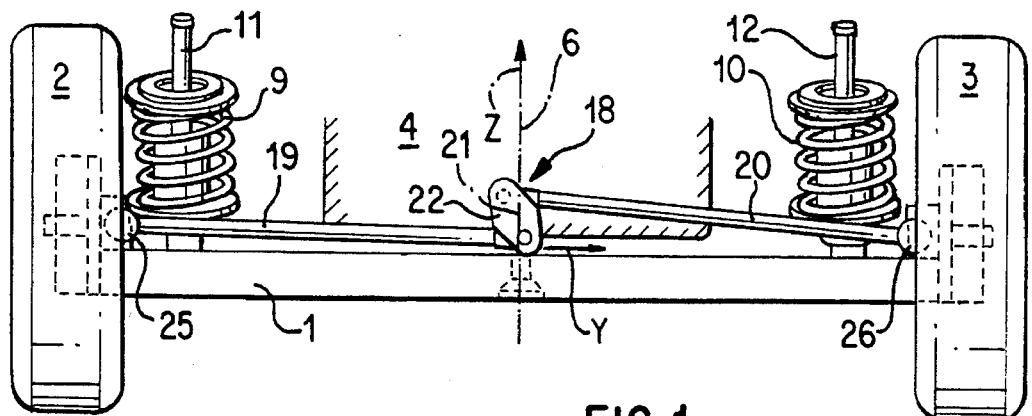
FIG. 1 is a front view of a currently contemplated embodiment of a rear axle suspension according to the present invention.
Figure 3:
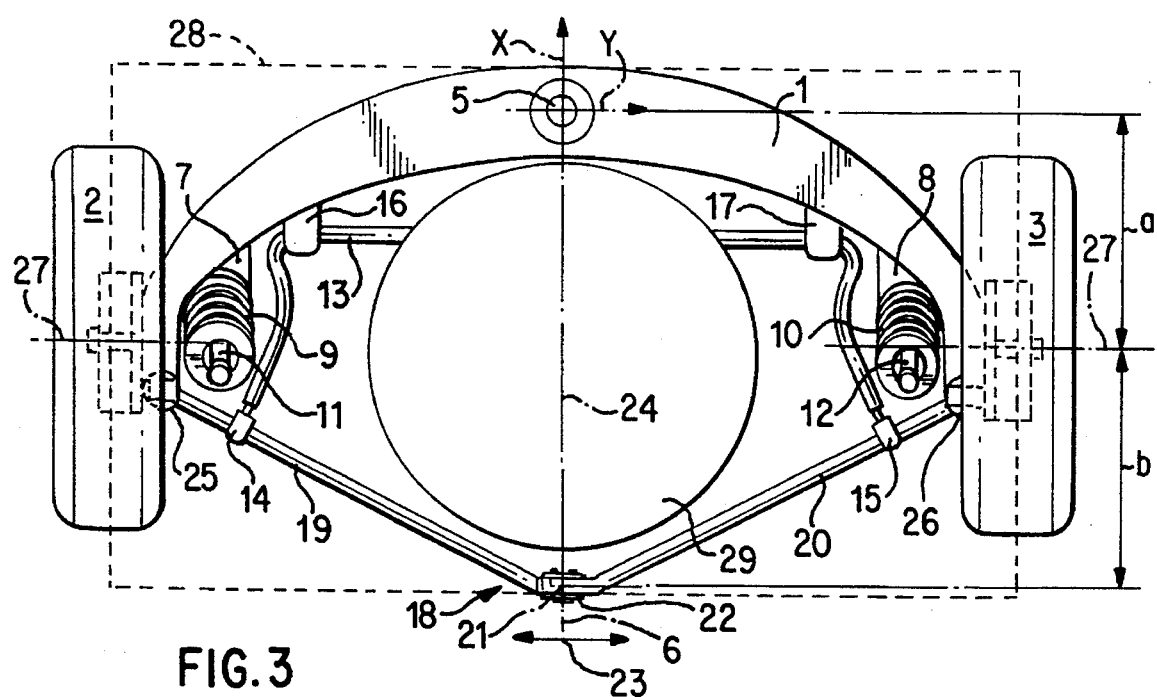
FIG. 3 is a plan view of FIG. 1.
Figure 2:
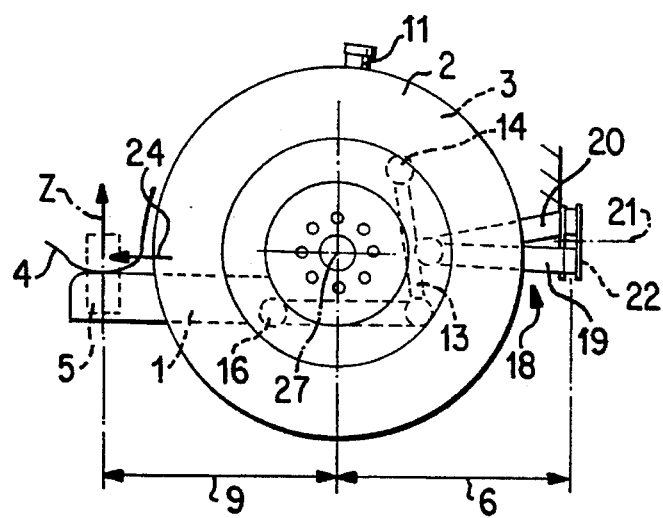
FIG. 2 is a side view of FIG. 1.

FIGS. 1 to 3 show in respective views a motor vehicle rear axle suspension in which the inherently stiff axle guide member is formed by an axle tube 1 curved in the forward direction of travel designated by arrow 24 in FIG. 3. A wheel 2, 3 respectively is mounted at each of the two ends of this axle tube 1. The axle tube 1 is supported in a universal joint on the vehicle body 4 by a resilient joint 5 which is arranged in the central longitudinal plane 6 of the vehicle. That is, the joint 5 permits rotary movement of the axle tube 1 about all three spatial axes x, y and z.

In the region of each of the two ends of the axle tube 1 a respective support device 7, 8 is fastened to the axle tube 1, against each of which a respective bearing spring 9, 10 (e.g., a coil spring) is supported for the spring suspension of the vehicle body 4. Respective shock absorbers 11, 12, each of which is surrounded concentrically by one of the two coil springs 9, 10, are also articulated on each of these support devices 7, 8.

In order to reduce the lateral inclination of the vehicle body 4 during cornering, a torsion-bar stabilizer 13 is articulated on the body 4 by the joints 14, 15 and on the axle tube 1 by the joints 16, 17. For the sake of clarity the stabilizer 13 is not shown in the front view of FIG. 1.

The lateral guidance of the rear axle is effected by a Watt linkage 18 having two links 19, 20 which are each articulated on the axle tube 1 at their end in the region near the wheel 2, 3 and, at their respective other ends, on the two ends of a rocker 22 which is rotatable about an axis 21. The rocker 22 itself, that is to say its stationary part, is fastened to the vehicle body 4. An equalizing movement of the two links 19, 20 in the transverse direction designated by double arrow 23 in FIG. 3 is thus made possible. The two links 19, 20 transmit only tensile and compressive forces because of their articulated connection to the axle tube 1 and to the rocker 22. As a further embodiment of the present invention, instead of a rocker, a different coupling device can be provided to permit equalizing movements of the two links in the transverse direction without departing from the spirit of the present invention.

The axis of rotation 21 of the rocker 22 of the Watt linkage 18, like the point of articulation of the axle tube 1 on the body 4, also lies in the central longitudinal plane 6 of the vehicle. In addition, referring to the forward direction of travel (arrow 24), the rocker 22 lies behind the points of support 25, 26 respectively of the two links 19, 20 on the axle tube 1, so that the Watt linkage 18 can have a backswept configuration. In this arrangement the distance, b, between the rocker 22 and the wheel rotation axis 27 is substantially equal to the distance, a, from the axle tube 1, in the region of the articulation on the vehicle body 4, to the wheel rotation axis 27. It is thus ensured that lateral forces occurring on the wheels 2 or 3 (e.g., during cornering) are supported substantially in equal parts both at the joint 5 and at the fastening point of the rocker 22 on the body 4.

The distances, a and b, between the wheel rotation axis 27 and, respectively, the point of articulation of the axle tube 1 on the body 4 and the rocker 22, fastened to the body 4, of the Watt linkage 18 are only slightly greater than the radius of a wheel 2 or 3, so that practically the entire rear axle suspension lies within a rectangle 28, imagined in plan view by the dashed lines, formed by the wheel diameters and the distance between the wheels. That is, the whole rear wheel suspension requires only little installation space. Nevertheless, there is always still sufficient room between the axle tube 1 and the Watt linkage 18 for a recess 29 formed in the vehicle body 4 to house a spare wheel.

As a further embodiment of the invention, the universal joint articulation of the axle tube on the body, instead of being effected by a single central joint, may also be achieved by two individual joints which are arranged symmetrically to and at a short distance from the central longitudinal plane of the vehicle. These two mountings are then so configured, in respect to their alignment and elasticity, that the axle tube is once again articulated in universal joint fashion on the body. That is, it is rotatable in space about all three axes x, y and z, but with the only difference being that the center of rotation is, of course, here not situated in one of the mountings themselves, but between the two mountings in the central longitudinal plane of the vehicle. The central joint, as provided in the embodiment according to FIGS. 1 to 3, is in this further embodiment replaced by an imaginary point or pole about which the axle tube can turn. This further embodiment is particularly suitable for suspensions of rear axles which are driven from a front engine. The cardan shaft between the two mountings can then be passed through to a differential fastened to the body, without special measures having to be taken in respect of the axle tube itself (e.g., lowering or raising in the region of the cardan shaft leadthrough).

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A motor vehicle rear axle suspension having an inherently stiff axle guide member comprising an axle tube extending transversely to a direction of vehicle travel and at each of two ends thereof having a wheel mounted thereon, the axle guide member being supported on a vehicle body in a region of each of the two axle tube ends by a respective bearing spring and being articulated on the vehicle body by a universal joint in a region of the central longitudinal plane of the vehicle, rearwardly of an axis of rotation of the wheel, with reference to a forward direction of vehicle travel, said suspension having a lateral guide linkage comprising two individual links, in which one of the links is articulately supported, at one end thereof in a region of the wheel, on one end of the axle tube, and the other link is articulately supported, by an end thereof in the region of the wheel, on the other end of the axle tube, and in which other ends of the links are articulated to a coupling device configured and arranged to permit equalizing movements of the links in a transverse direction of the vehicle and fastened to the vehicle body in the region of the central longitudinal plane behind points of support of the links on the axle tube, with respect to the forward direction of vehicle travel, wherein the axle tube has a configuration curved in the forward direction of vehicle travel, and a distance between the axle tube, in a region of articulation of the axle tube on the vehicle body, and the axis of rotation of the wheel is substantially equal to a distance from the lateral guide linkage, in a region of articulation thereof on the vehicle body, to the axis of rotation of the wheel.

2. The suspension according to claim 1, wherein the coupling device is a rocker, the respective other ends of the links being articulated at each of opposite ends of the rocker.

3. The suspension according to claim 1, wherein the distance between the axle tube, at the articulation thereof on the body, and the axis of rotation of the wheel is only slightly greater than the radius of a wheel.

4. The suspension according to claim 3, wherein the coupling device is a rocker, the respective other ends of the links being articulated at each of opposite ends of the rocker.

* * * * *